(12) United States Patent
Harik

(10) Patent No.: US 9,390,383 B2
(45) Date of Patent: Jul. 12, 2016

(54) METHOD FOR AN OPTIMIZING PREDICTIVE MODEL USING GRADIENT DESCENT AND CONJUGATE RESIDUALS

(71) Applicants: PageBites, Inc., Palo Alto, CA (US);
Georges Harik, Palo Alto, CA (US)

(72) Inventor: Georges Harik, Palo Alto, CA (US)

(73) Assignee: Georges Harik, Palo Alto, CA (US)

( * ) Notice: Subject to any disclaimer, the term of this patent is extended or adjusted under 35 U.S.C. 154(b) by 242 days.

(21) Appl. No.: 14/165,431

(22) Filed: Jan. 27, 2014

(65) Prior Publication Data

US 2014/0214735 A1    Jul. 31, 2014

Related U.S. Application Data

(60) Provisional application No. 61/757,668, filed on Jan. 28, 2013.

(51) Int. Cl.
*G06F 15/18* (2006.01)
*G06N 99/00* (2010.01)

(52) U.S. Cl.
CPC ................... *G06N 99/005* (2013.01)

(58) Field of Classification Search
None
See application file for complete search history.

(56) References Cited

U.S. PATENT DOCUMENTS

| | | | | |
|---|---|---|---|---|
| 8,290,867 B2 * | 10/2012 | Nielsen | G06Q 20/102 | 705/35 |
| 8,352,452 B2 * | 1/2013 | Dean | G06F 17/30864 | 707/706 |
| 8,412,747 B1 * | 4/2013 | Harik | G06F 17/27 | 707/803 |
| 8,572,181 B1 * | 10/2013 | Harik | G06Q 10/10 | 709/205 |
| 8,619,978 B2 * | 12/2013 | Harik | G06F 21/41 | 380/277 |
| 8,639,742 B2 * | 1/2014 | Fredricksen | H04L 29/08729 | 709/202 |
| 8,688,720 B1 * | 4/2014 | Harik | G06F 7/00 | 707/755 |
| 8,768,302 B2 * | 7/2014 | Coleman | H04L 63/083 | 455/410 |
| 8,788,475 B2 * | 7/2014 | Fredricksen | G06F 17/30011 | 707/689 |
| 8,825,754 B2 * | 9/2014 | Fredricksen | H04L 29/08729 | 709/203 |
| 9,141,589 B2 * | 9/2015 | Shazeer | G06F 17/2235 | |
| 9,166,806 B2 * | 10/2015 | Dean | G06F 17/30699 | |
| 9,185,098 B2 * | 11/2015 | Harik | H04L 63/08 | |
| 2006/0129351 A1 * | 6/2006 | Washizawa | G06F 17/12 | 702/179 |
| 2010/0157372 A1 * | 6/2010 | Qiao | H04N 1/6058 | 358/3.01 |
| 2014/0258206 A1 | 9/2014 | Harik | | |
| 2014/0279748 A1 | 9/2014 | Harik | | |

OTHER PUBLICATIONS

GPU accelerated geometric multigrid method: Comparison with preconditioned conjugate gradient, Iulian Stroia; Lucian Itu; Cosmin Nita; Laszlo Lazar; Constantin Suciu High Performance Extreme Computing Conference (HPEC), 2015 IEEE Year: 2015 pp. 1-6, DOI: 10.1109/HPEC.2015.7322480 IEEE Conference Publications.*

(Continued)

*Primary Examiner* — Michael B Holmes
(74) *Attorney, Agent, or Firm* — Edward C. Kwok; Hogan Lovells US LLP

(57) ABSTRACT

An optimization in machine learning is achieved using Newton's algorithm together with an efficient technique for solving linear equations, such as the method of conjugate residuals. The techniques of the present invention are applicable to learning language models, predicting classes of objects from images and videos, and classifying financial transactions for prevention of fraud. Other uses include determining a function from a sequence of words to a relevant web page for a search engine, or to inverting arbitrary output values of an analyzed system into an internally running simulation.

7 Claims, 1 Drawing Sheet

(56) References Cited

OTHER PUBLICATIONS

Minimum residual methods for cloth simulation Mihai Francu; Florica Moldoveanu System Theory, Control and Computing (ICSTCC), 2014 18th International Conference Year: 2014 pp. 550-555, DOI: 10.1109/ICSTCC.2014.6982474 IEEE Conference Publications.*

A Globally Convergent Stochastic Pairwise Conjugate Gradient-Based Algorithm for Adaptive Filtering Noor Atinah Ahmad IEEE Signal Processing Letters Year: 2008, vol. 15 pp. 914-917, DOI: 10.1109/LSP.2008.2005437 IEEE Journals & Magazines.*

Parametric identification by minimizing the squared residuals (Application to a photovoltaic cell) Benyounes Oukarfi; Fayrouz Dkhichi; Abderrahim Fakkar Renewable and Sustainable Energy Conference (IRSEC), 2013 International Year: 2013 pp. 40-45, DOI: 10.1109/IRSEC.2013.6529637 IEEE Conference Publications.*

Luenberger, David G., "The Conjugate Residual Method for Constrained Minimization Problems", Siam J. Numer. Anal, vol. 7, No. 3, Sep. 1970, pp. 390-398.

* cited by examiner

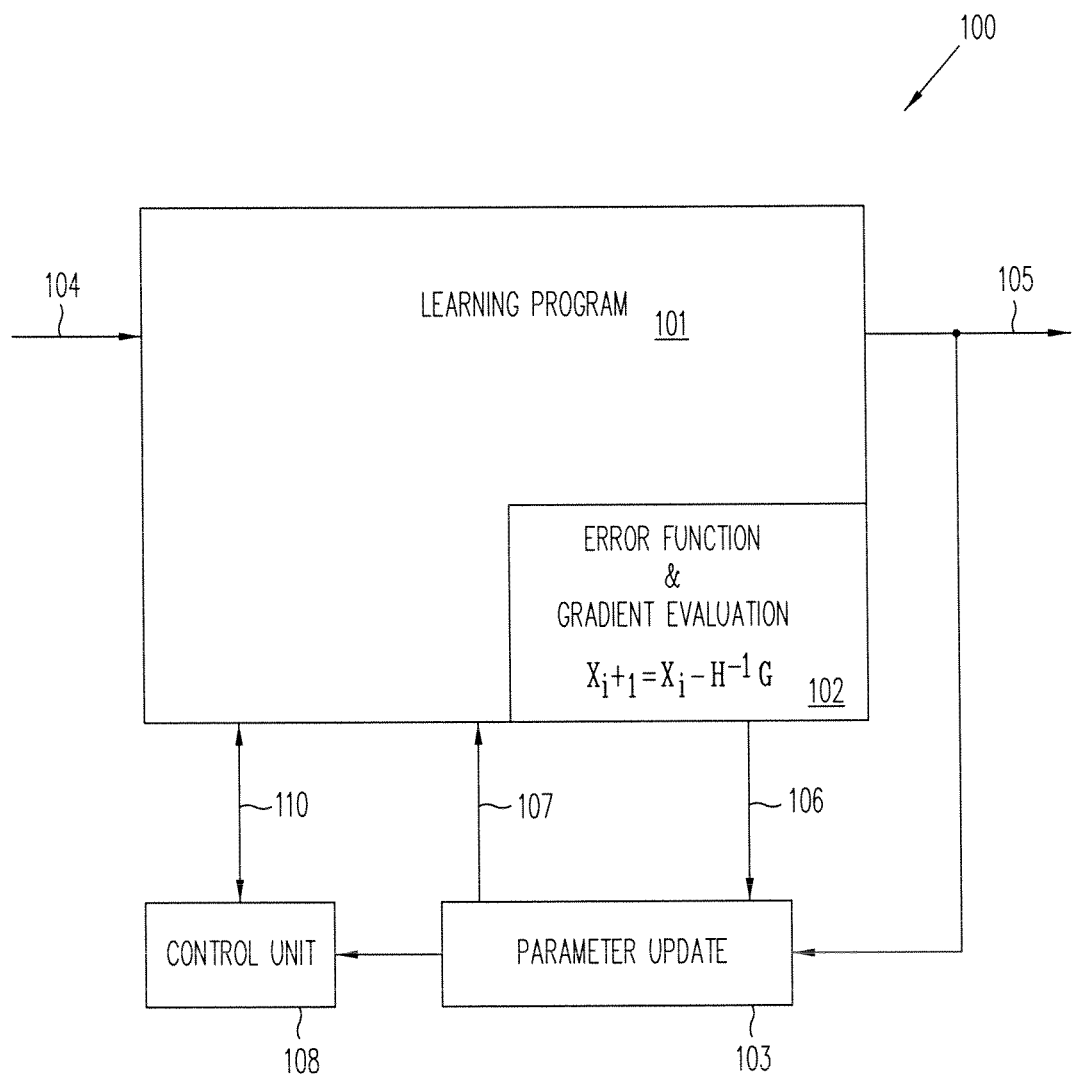

METHOD FOR AN OPTIMIZING PREDICTIVE MODEL USING GRADIENT DESCENT AND CONJUGATE RESIDUALS

CROSS REFERENCE TO RELATED APPLICATIONS

The present application relates to and claims priority of U.S. provisional patent application ("Provisional Application"), Ser. No. 61/757,668, entitled "Method for An Optimizing Predictive Model using Gradient Descent and Conjugate Residuals," filed on Jan. 28, 2013. The disclosure of the Provisional Application is hereby incorporated by reference in its entirety.

BACKGROUND OF THE INVENTION

1. Field of the Invention

The present invention relates to improving computational and statistical efficiency in a predictive model. In particular, the present invention relates to improving computational efficiency in a predictive model that is optimized using gradient and higher-order derivative-based methods, such as stochastic gradient descent or Newton's steps based optimization techniques.

2. Discussion of the Related Art

In machine learning, a predictive model is a computational model that learns a function ("target function") from example input and output values. One type of predictive model applies a gradient descent optimization technique over an objective function. Typically, the optimization procedure involves iteratively executing the model, and then differentiating the model (i.e., calculating the first derivative of each model parameter) to adapt the values of the model parameters to minimize or maximize the objective function. The complexity of such a computation task is typically at least proportional to the size of the model. Therefore, it is desirable to have a model that is smaller, and which requires fewer computational operations.

A predictive model may be implemented, for example, in a neural network. A neural network model is usually based on a graph consisting of nodes (referred to as "neurons"), and directed, weighted edges that connect the neurons. The directed graph typically represents the function that is to be computed in the computational model. In a typical implementation, each neuron is assigned a simple computational task (e.g., a linear transformation followed by a squashing function, such as a logistic function) and the loss function (e.g., an additive inverse of the objective function) is computed over the entire neural network model. The parameters of the neural network model are typically determined ("learned") using a method that minimizes the loss function. Stochastic gradient descent is a method that is often used to achieve the minimization. In stochastic gradient descent, optimization is achieved iteratively by (a) finding analytical gradients for the loss functions and (b) perturbing or moving the test values by a small amount in the opposite direction of the gradient, until the loss function is minimized.

SUMMARY

The present invention provides an optimization method for machine learning, using a gradient descent method (e.g., Newton's algorithm) together with an efficient technique for solving a set of linear equations (e.g., the method of conjugate residuals). The techniques of the present invention are applicable to learning language models, predicting classes of objects from images and videos, and classifying financial transactions for prevention of fraud. Other uses include determining a function from a sequence of words to a relevant web page for a search engine, or to inverting arbitrary output values of an analyzed system into an internally running simulation.

The present invention is better understood upon consideration of the detailed description below.

BRIEF DESCRIPTION OF THE DRAWINGS

FIG. 1 is a block diagram of one implementation of optimizing predictive model 100 for learning a target function, according to one embodiment of the present invention.

DETAILED DESCRIPTION OF THE PREFERRED EMBODIMENTS

In machine learning, the parameters of a program may be optimized to achieve one or more objectives of the program. One optimization method computes the first derivatives of such parameters of the program, which are then used in a gradient descent method. Techniques have been developed to improve performance at the gradient descent step, such as by adding a momentum term (e.g., making the gradient carry over some of its previous values) or making the gradient descent method stochastic. Still, many programs have been difficult to optimize using these methods.

Newton's algorithm, which uses second derivatives, has also been used in many optimization techniques. In a multivariate problem, the Newton's step requires an update of parameter values in the form:

$$X_{i+1} = X_i - H^{-1} G$$

where the elements of vector $X_i$ are the parameter values at step i, the matrix $H^{-1}$ is the inverse of the Hessian matrix of all second derivatives of the objective function that is to be minimized with respect to every pair of parameter values, and G is the gradient vector of the objective function. For an arbitrary function to be learned, however, the number of parameter values (i.e., variables) often exceeds a few million. In that example, the Hessian matrix H will have more than a trillion second derivatives. Such a matrix is very difficult to store. However, one observes that matrix $H^{-1}$ is involved only in a matrix multiplication between it and the gradient vector G. Therefore, when one solves the set of linear equations Hz=G in an efficient way, the solution z is the multiplication result that is achieved without expressly performing the multiplication. This is because, by solving the equation Hz=G, the solution vector obtained is $z=H^{-1} G$, which is the required multiplication.

One difficulty that limits the use of this method in optimizing programs (e.g., in the neural networks context) is the fact that techniques for solving the set of equations Hz=G are relatively readily available only when the Hessian matrix H is positive definite, but much less readily available otherwise. In general, as the Hessian matrix is not necessarily positive definite, approximations to the Hessian matrix (e.g., the Gauss-Newton approximation) have been used.

The present inventor recognizes that the method of conjugate residuals can be used to iteratively solve the linear equations Hz=G, without requiring Hessian matrix H to be positive definite, or to use a positive definite approximation $\tilde{H}$ of the Hessian matrix H. The method of conjugal residuals is described, for example, in the article, "The Conjugate Residual Method for Constrained Minimization Problems," by David G. Luenberger, published in *Siam J., Numer. Anal.*, Vol. 7, No. 3, September 1970, pp. 390-98, which is also available at http://www.stanford.edu/dept/MSandE/cgi-bin/people/faculty/luenberger/pdfs/tcrmfcmp.pdf. Under the conjugate residual method, the Hessian matrix H is required only to be symmetric, which is true in many cases of typically used program structures. It also requires being able to multiple the Hessian by arbitrary vectors z. The multiplication Hz is easily carried out by forward differentiation starting with the forward derivatives of the model parameters set at z, and ending at the gradient computation for the original program.

According to one embodiment of the present invention, therefore, an optimization algorithm for machine learning is achieved by combining the method of conjugate residuals—i.e., the method for achieving multiplication by the inverse Hessian matrix efficiently—with Newton's algorithm. The techniques of the present invention are applicable to learning language models, predicting or identifying classes of objects from images and videos, and classifying financial transactions for prevention of fraud. Other applications include determining a function from a sequence of words to a relevant web page for a search engine, or to inverting arbitrary output values of an analyzed system into an internally running simulation.

In one embodiment, to solve the equation Hz=G, the method sets initial values $z_0$, $r_0$=G−H$z_0$ and $p_0$=$r_0$, and iterates over index k as follows:

$$\alpha_k = \frac{r_k^T H r_k}{(Hp_k)^T Hp_k}$$

$$z_{k+1} = z_k + \alpha_k p_k$$

$$r_{k+1} = r_k - \alpha_k Hp_k$$

$$\beta_k = \frac{r_{k+1}^T H r_{k+1}}{r_k^T H r_k}$$

$$p_{k+1} = r_{k+1} + \beta_k p_k$$

$$Hp_{k+1} = Hr_{k+1} - \beta_k Hp_k$$

The iteration terminates when $\|r_k\|$ is sufficiently close to zero. Alternatively, iteration continues if $\alpha_k$>0, or if −c<$\beta_k$<c, where c is a positive constant value.

One implementation of the above conjugate residual algorithm is provided by the Lisp code below:

```
// Run conjugate gradient (residual) to multiply the inverse of the Hessian
// by the gradient. Start with p__0 = the current gradient
(def 'ad-rg (lambda (model)
(let len (length model)
(let decide (ad-new 1 1)
(let r__l2__best __1000000 (let r__l2 __1000000
(let beta__n __0 (let beta __0 (let alpha__n __0 (let alpha__d __0 (let alpha __0
(let R (marray) (let P (marray) (let X (marray)
(let AR nil (let AP (marray)
(progn
(repeat i len // Initialize the vectors
  (let rm (aref g__acc i)
  (progn
  (push-back R (matrix-copy rm (ad-same rm)))
  (push-back P (matrix-copy rm (ad-same rm)))
  (push-back X (matrix__setconstant (ad-same rm) __0)))))
(set AR (ad-hessian-times R model __0))
(repeat i len // AP has memory apart from ad
  (push-back AP (matrix-copy (aref AR i) (ad-same (aref AR i)))))
(repeat gen 16 // g__gradient__groups
  // Entering here AR and AP are set
  (progn
```

```
// (print 'model__l2 (matrix-a-dot model model) eol)
(set alpha__n (matrix-a-dot R AR))
(set alpha__d (matrix-a-dot AP AP))
// (print 'alpha__n space alpha__n space 'alpha__d space alpha__d eol)
(set alpha (/ alpha__n (+ __0.1 alpha__d)))
// (print 'alpha space alpha eol)
// increment R (k+1)
(repeat i len (matrix-add (aref AP i) (aref R i) (− __0 alpha)))
(set r__l2 (sqrt (matrix-a-dot R R)))
// (print 'R__L2 space r__l2 eol)
// increment AR (k+1)
(set AR (ad-hessian-times R model __0))
(set beta__n (matrix-a-dot R AR))
(set beta (/ beta__n (+ __0.1 alpha__n)))
// (print 'beta space beta eol)
(if (or (< alpha __0)
    (< r__l2__best r__l2) (< __1 beta) (< beta __−1))
  (matrix__setcell decide 0 0 __0)
  (matrix__setcell decide 0 0 __1))
(mpi-matrix-rank0-all decide)
(if (< (matrix__dot decide decide) __0.5) break
(progn
(set r__l2__best r__l2)
// increment X (k+1)
(repeat i len (matrix-add (aref P i) (aref X i) alpha))
// increment P (k+1)
(repeat i len
  (matrix-add-2f (aref R i) (aref P i) __1 beta))
// increment AP (k+1)
(repeat i len
  (matrix-add-2f (aref AR i) (aref AP i) __1 beta))
))))
X)))))))))))))))))
```

FIG. 1 is a block diagram of one implementation of optimizing predictive model 100 for learning a target function, according to one embodiment of the present invention. In this description, merely by way of example, the target function is described as a textual search function performed over training data consisting of a corpus of documents. However, as mentioned above, many other suitable applications are possible and within the scope of the present invention. As shown in FIG. 1, optimizing predictive model 100 includes learning program 101, which implements the target function to be learned. Learning program 101 receives input vector 104 from the training data and model parameter values 107 to provide output vector 105. Input vector 104 may include, for example, the textual search query. Output vector 105 is, for example, a "best document" probability distribution computed by learning program 101 based on model parameter values 107 over the documents in the training data. Integrated into learning program 101 is stochastic gradient descent module 102 which carries out evaluations of the loss or error function and the gradient vector 106 for the loss or error function with respect to model parameters values 107. In stochastic gradient descent module 102, the above-described Newton's method is used in conjunction with the method of conjugate residuals to obtain output vector 105 and gradient vector 106, which are then provided to parameter update module 103. Updated parameter values 107 are fed back into configuring learning program 101. Learning program 101 may be implemented in a computational environment that includes a number of parallel processors. In one implementation, each processor may be a graphics processor, to take advantage of computational structures optimized for arithmetic typical in such processors. Control unit 108 (e.g., a host computer system using conventional programming techniques) may configure the computational model for each program to be learned. Learning program 101 may be organized, for example, as a neural network model. The program model implemented in learning program 101 may be variable, taking into account, for example, the structure and values of the input vector and the structure and values of the expected output data. Control flow in the program model may be constructed based on the input vector or intermediate values ("states values") computed in the program model.

Computational models that are created using similar machine learning techniques find applications in, for example, predicting a possible next word or phrase in a text sequence, such as frequently encountered in a speech recognition application, for example. Another example is a document search application which identifies documents containing text segments from which a given text segment may likely have originated. This application is useful in searching text based on an approximate or incomplete query. The methods of the present invention may be used to build other search engines over text.

The above detailed description is provided to illustrate the specific embodiments of the present invention and is not intended to be limiting. Numerous modifications and variations within the scope of the present invention are possible. The present invention is set forth in the following claims.

I claim:

1. A method for training a program by optimizing a set of program parameter values, comprising optimizing the parameter values using the Newton's algorithm, wherein successive updates of the parameter values are provided by a method of conjugate residuals, which computes each of the successive updates by solving a set of linear equations involving a Hessian matrix and a gradient vector.

2. A method as in claim 1, wherein the method of conjugate residuals terminates when the $\alpha$ parameter in the method of conjugate residuals has a value not greater than 0.

3. A method as in claim 1, wherein the method of conjugate residuals terminates the $\beta$ parameter in the method of conjugate residuals has an absolute value that is not less than a pre-determined constant value.

4. A system for training a program by optimizing a set of program parameter values, comprising:
   a first set of computational elements for modeling the program to be trained, the processors receiving an input vector and providing an output vector;
   a second set of computational elements for optimizing the parameter values using an iterative method, wherein successive updates of the parameter values are provided by a method of conjugate residuals, which computes each of the successive updates by solving a set of linear equations involving a Hessian matrix and a gradient vector; and
   a control unit for controlling the operations of the first and second sets of computational elements.

5. The system of claim 4, wherein the iterative method comprises Newton's algorithm.

6. A system as in claim 4, wherein the method of conjugate residuals terminates when the $\alpha$ parameter in the method of conjugate residuals has a value not greater than 0.

7. A system as in claim 4, wherein the method of conjugate residuals terminates the $\beta$ parameter in the method of conjugate residuals has an absolute value that is not less than a pre-determined constant value.

* * * * *